(12) United States Patent
Powell et al.

(10) Patent No.: US 7,204,397 B2
(45) Date of Patent: Apr. 17, 2007

(54) CARGO CONTAINER ATTACHMENT

(75) Inventors: Matthew Elmer Powell, Fox Lake, WI (US); Brian James Hitt, Hartford, WI (US); Jeffrey Robert Braun, Colgate, WI (US)

(73) Assignee: Deere & Company, Moline, IL (US)

( * ) Notice: Subject to any disclaimer, the term of this patent is extended or adjusted under 35 U.S.C. 154(b) by 144 days.

(21) Appl. No.: 10/424,699

(22) Filed: Apr. 28, 2003

(65) Prior Publication Data

US 2004/0211803 A1   Oct. 28, 2004

(51) Int. Cl.
*B60R 7/00* (2006.01)

(52) U.S. Cl. .................. 224/410; 224/527; 224/526; 296/50; 296/51; 296/56

(58) Field of Classification Search ............ 224/410, 224/401, 280, 498, 499, 502, 503, 504, 505, 224/507, 526, 527, 42.23, 404; 296/56, 13, 296/10, 37.6, 50, 51, 52; D15/28, 14, 15, D15/17; 220/810, 811, 812, 4.31, 813; 298/17 R, 298/19 R, 22 R; 108/14, 26, 35, 38
See application file for complete search history.

(56) References Cited

U.S. PATENT DOCUMENTS

| | | | | |
|---|---|---|---|---|
| 210,112 | A * | 11/1878 | Gadbouis ................... 296/56 |
| 393,016 | A * | 11/1888 | Lennon ..................... 296/56 |
| 3,497,073 | A * | 2/1970 | Bartell ....................... 211/2 |
| 4,569,187 | A * | 2/1986 | Spiker et al. ............. 56/202 |
| 4,585,265 | A * | 4/1986 | Mader ..................... 296/56 |
| 4,596,347 | A * | 6/1986 | Hite .......................... 224/410 |
| 4,770,440 | A | 9/1988 | Lander ..................... 280/760 |
| 4,809,851 | A * | 3/1989 | Oestreich et al. .......... 206/599 |
| 5,232,260 | A * | 8/1993 | Lippard ..................... 296/51 |
| 5,352,008 | A * | 10/1994 | Denvir ...................... 296/50 |
| 5,535,931 | A * | 7/1996 | Barlow et al. ............. 224/404 |
| 5,615,922 | A * | 4/1997 | Blanchard ................. 296/37.6 |
| 5,660,291 | A * | 8/1997 | Dash ........................... 220/6 |
| 5,899,519 | A * | 5/1999 | Doshi ....................... 296/39.2 |
| 6,179,361 | B1 * | 1/2001 | Sailors ....................... 296/50 |
| 6,378,748 | B1 | 4/2002 | Cox .......................... 224/511 |
| 6,390,527 | B1 * | 5/2002 | Leftridge .................... 296/56 |
| 6,439,444 | B1 * | 8/2002 | Shields, II ................. 224/280 |
| 6,502,654 | B2 * | 1/2003 | Witte et al. ................ 180/89.1 |
| 6,584,757 | B2 * | 7/2003 | Komorida et al. ........... 56/202 |
| 6,764,130 | B1 * | 7/2004 | Hull ......................... 296/186.4 |
| 6,766,633 | B2 * | 7/2004 | Wanie et al. ................. 56/202 |
| D495,878 | S * | 9/2004 | Greene ....................... D3/274 |
| 2002/0070255 | A1 | 6/2002 | Hebert et al. .............. 224/401 |
| 2002/0070575 | A1 * | 6/2002 | Leftridge .................... 296/56 |

* cited by examiner

*Primary Examiner*—Tri M. Mai

(57) ABSTRACT

A cargo container attachment for a small vehicle such as a lawn tractor is provided. The container is removably attached to the rear of the vehicle and includes a cargo box storage space with a pivotally mounted swingable tailgate. The container is designed to be used in conjunction with a lawn tractor to perform landscaping and structural maintenance tasks. Materials such as mulch, soil and plantings as well as maintenance materials can be transported in the cargo space. The tailgate can be moved between a first position where it serves to enclose the storage space and a second position where its serves as a workbench surface. Tool receiving recesses are provided in the sidewall edges of the composite container for transporting small tools such as trimmers, shovels, shears and/or rakes.

14 Claims, 6 Drawing Sheets

CARGO CONTAINER ATTACHMENT

FIELD OF THE INVENTION

The present invention relates to vehicles such as small lawn and/or garden tractors and more specifically to an attachment which can be used for performing landscaping and structural maintenance tasks.

BACKGROUND OF THE INVENTION

Lawn tractors and their mowers have become common work tools for homeowners, small businesses, nursery operators and grounds care operators. These tractors and their rotary mowers have become very useful for mowing and maintaining homeowner lawns and business grounds.

Typically, these lawns and grounds are landscaped with shrubs, trees, flowers and other plantings which require regular maintenance and attention. Additionally, they are occupied by buildings, fences and similar structures which require regular maintenance and attention.

It would therefore be desirable to be able to utilize such lawn tractors in performing the required landscaping and structural maintenance tasks.

SUMMARY OF THE INVENTION

Towards this goal, there is provided an attachment for a lawn and garden type tractor which can be used to assist an operator in carrying out the required landscaping and structural maintenance tasks. The attachment takes the form of a cargo container which can be removably mounted to the rear portion of a tractor.

The container is provided with a cargo box which permits it to be used to transport various landscaping materials such as soil, mulch, sand, gravel, plants and shrubs. It is also provided with a rear tailgate which is pivotally attached to the sidewalls of the container. The tailgate can be swingably moved between a first position in which it serves as a rear sidewall for the cargo storage area and a second forwardly rotated and generally horizontal position where it rests on the sidewalls and serves as a work bench surface. With the tailgate in this second position, it can be used for landscaping tasks such as plant potting and trimming or structural maintenance tasks such as fence repairs.

The container is further provided with tool mounting slots or holes in the upper edges of its sidewalls for receiving and transporting small tools such as shovels, rakes, shears and trimmers.

With the present invention, there is provided a removable "garden keeper" attachment for a lawn tractor which can assist the homeowner or operator in carrying out the typical landscaping and structural maintenance tasks found at homes, businesses and similar sites.

DESCRIPTION OF THE PREFERRED EMBODIMENT

Figure 1:
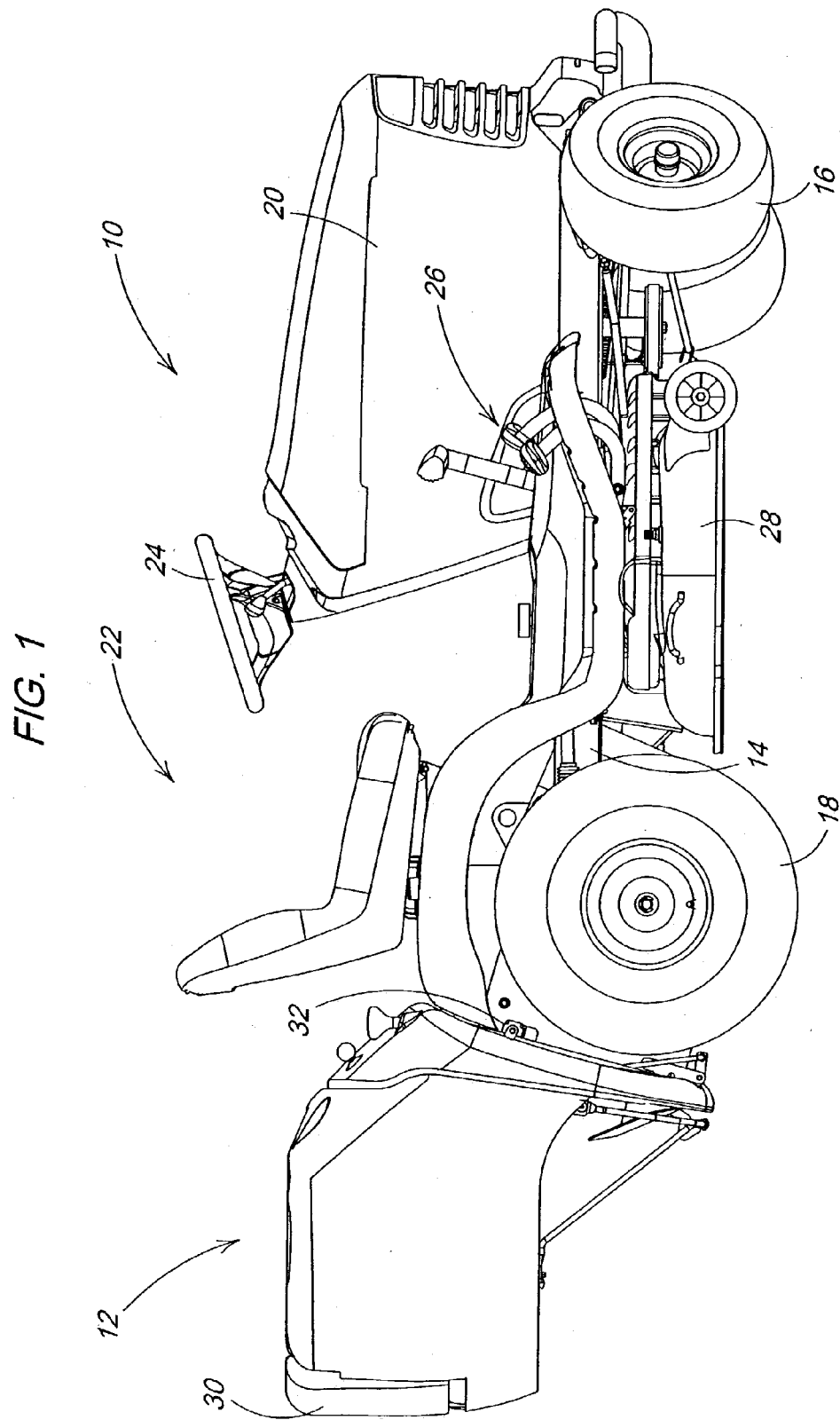
FIG. 1 is an illustration of the cargo container attachment mounted on the rear of a lawn tractor.

Looking first to FIG. 1, there is illustrated a lawn and garden type of tractor 10 with the cargo container attachment 12 subject of the present invention. The vehicle 10 is a typical small lawn tractor in that it includes a frame 14 supported by front steerable wheels 16 and rear drive wheels 18. At the front of the tractor 10 is carried an engine which is enclosed by a hood 20. Rearwardly of the engine is the operator station 22 with a steering wheel 24 and floor mounted foot controls 26. Carried beneath the tractor 10 and supported by the vehicle frame 14 is a rotary mower deck 28.

At the rear of the tractor 10 there is mounted the cargo container attachment or "garden keeper" 12. This container 12 takes the general form of a small cargo box with a swingable rear tailgate 30.

Figure 2:
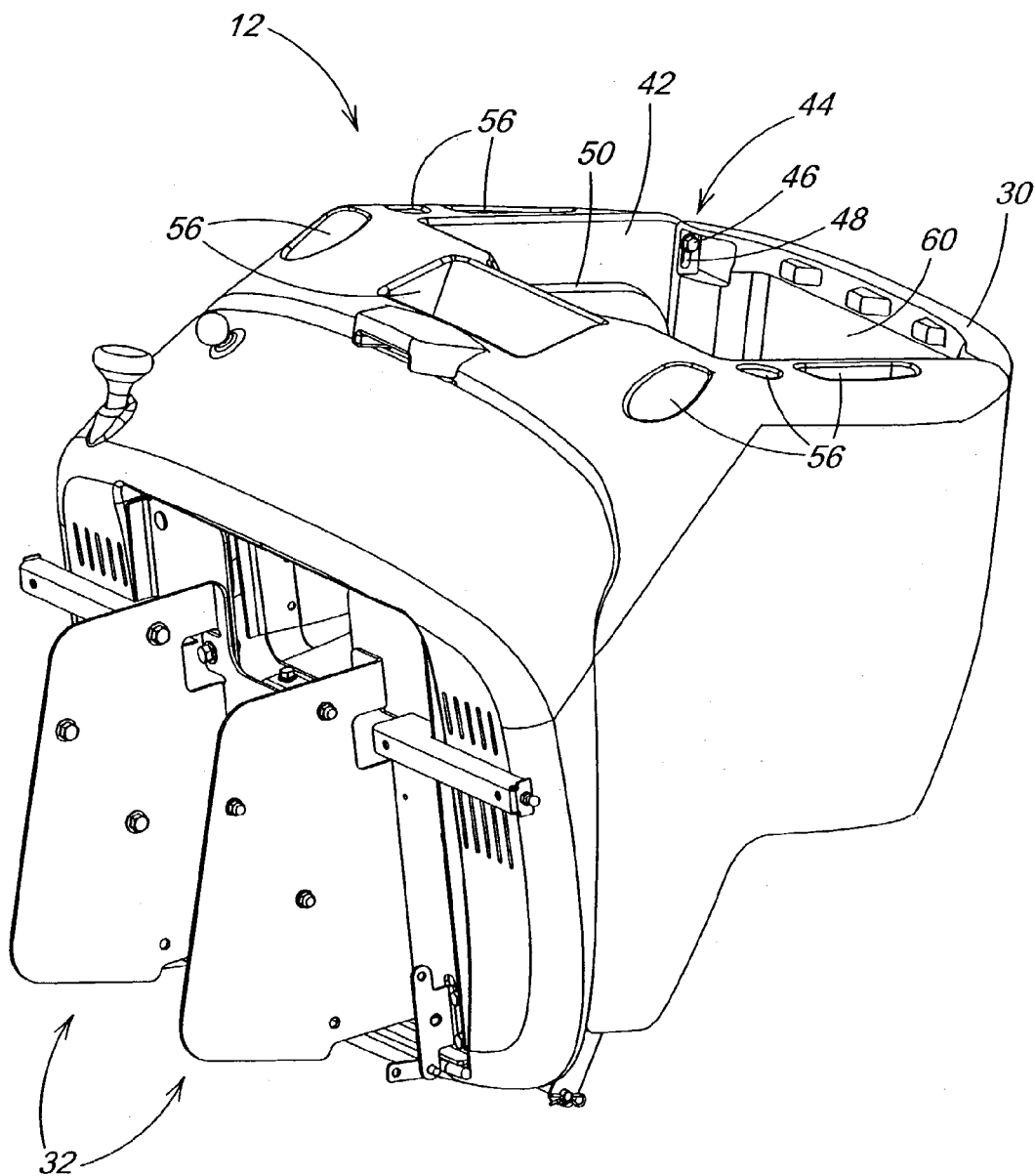
FIG. 2 illustrates an enlarged front left perspective and elevated view of the cargo container including its structure for removably attaching it to a vehicle.
Figure 9:
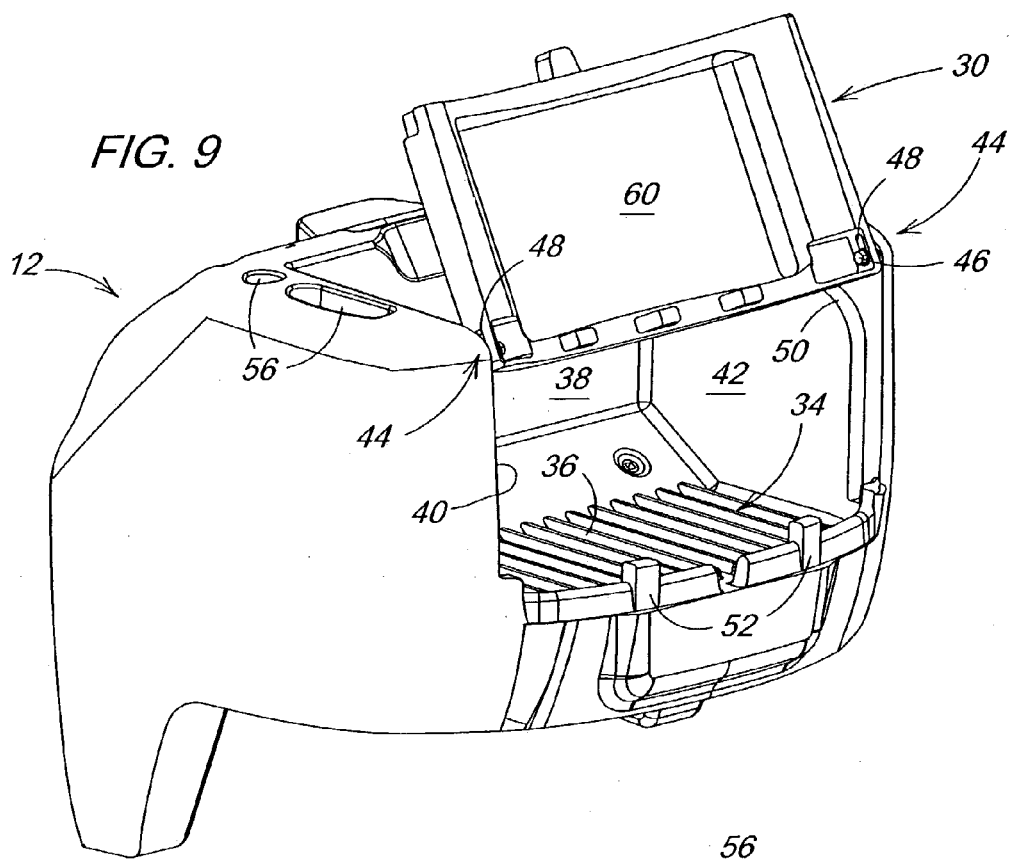
FIG. 9 illustrates a similar view to those in FIGS. 6 and 7, but with the tailgate swung yet further forwardly.

Looking now to FIG. 2, which illustrates the cargo container 12 in a front left elevated perspective, it can be seen that it is equipped with attaching bracketry 32 for removably mounting it to a vehicle such as the tractor 10 illustrated in FIG. 1. Looking as well to FIGS. 9 and 10, it can be seen that the cargo container 12 includes a floor or bottom member 34 which is provided with ribbed fore and aft extending members 36. Joined to the floor member 34 are three generally vertically extending sidewall members which include the front sidewall member 38 and spaced apart and generally parallel left and right side sidewall members 40 and 42. Together with the floor member 34 and these three sidewall members 38, 40 and 42, the tailgate or fourth sidewall member 30 forms a cargo box storage area.

Figure 3:
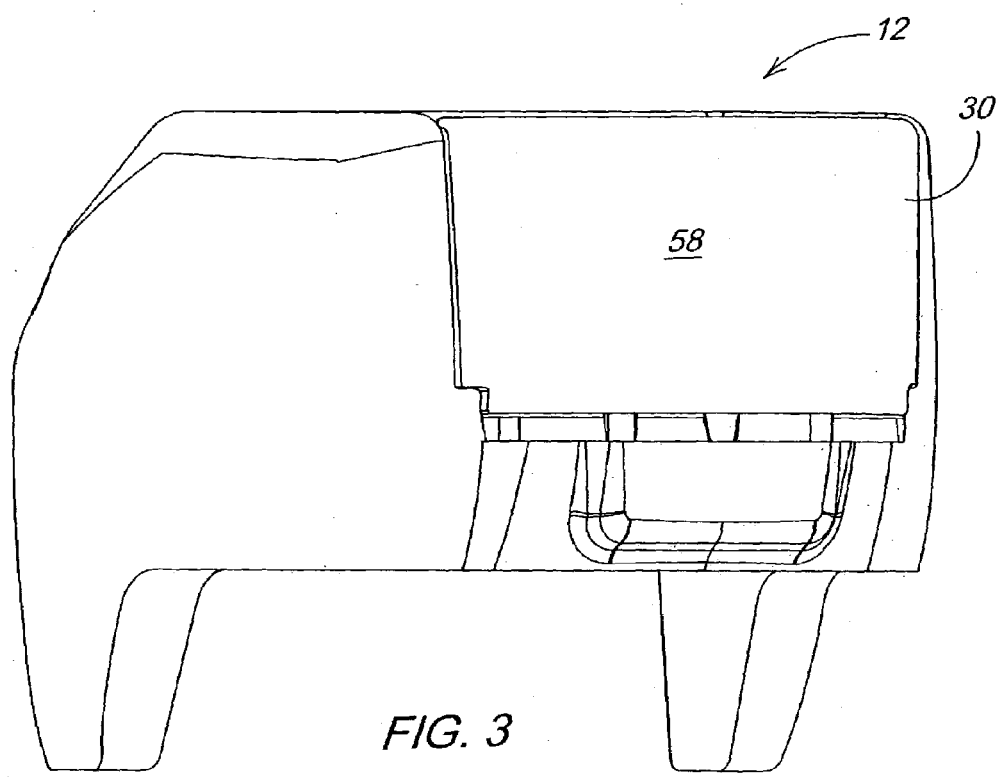
FIG. 3 illustrates a rear left side perspective view of the cargo container with the rear tailgate in the closed position.
Figure 5:
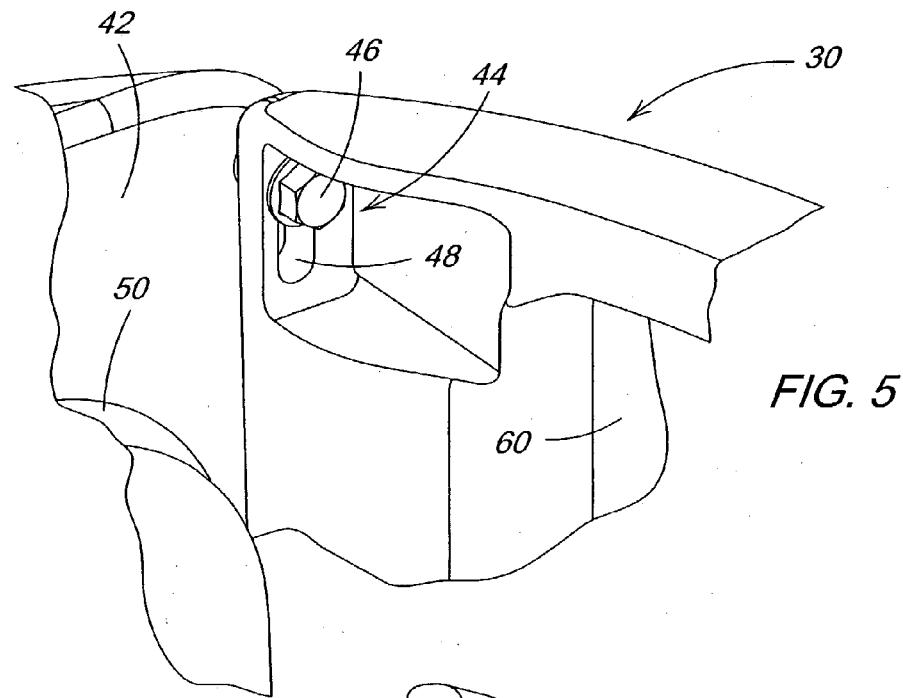
FIG. 5 illustrates an enlarged perspective view of the pivot structure between the sidewall members and the tailgate.
Figure 10:
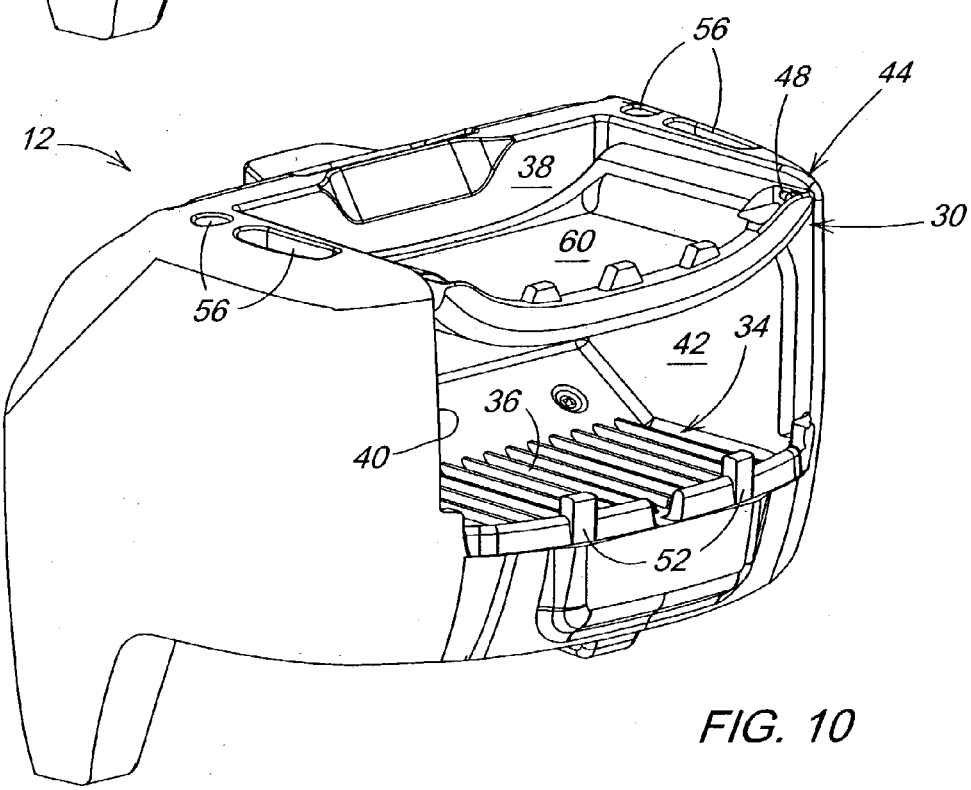
FIG. 10 illustrates a similar view to FIG. 9, but with the tailgate now swung forwardly into its second position where it serves as a working platform or bench.

At each lateral and rearwardly corner of the upper edge of the tailgate 30 is found a pivot structure 44, see FIGS. 2 and 5, which permit the tailgate 30 to swingably move between a first position as illustrated in FIG. 3 and a second position as illustrated in FIG. 10. The pivot structures 44, which are best illustrated in FIG. 5, are provided at each lateral upper edge of the tailgate 30 and are comprised of a bolt 46 mounted in the upper rear corner of each sidewall 40 and 42 which is received in a slot 48 provided in each upper lateral corner of the tailgate 30. It is these pivot structures 44 which permit the tailgate 30 to swingably move from the first position illustrated in FIG. 3 to its second position illustrated in FIG. 10.

Figure 7:
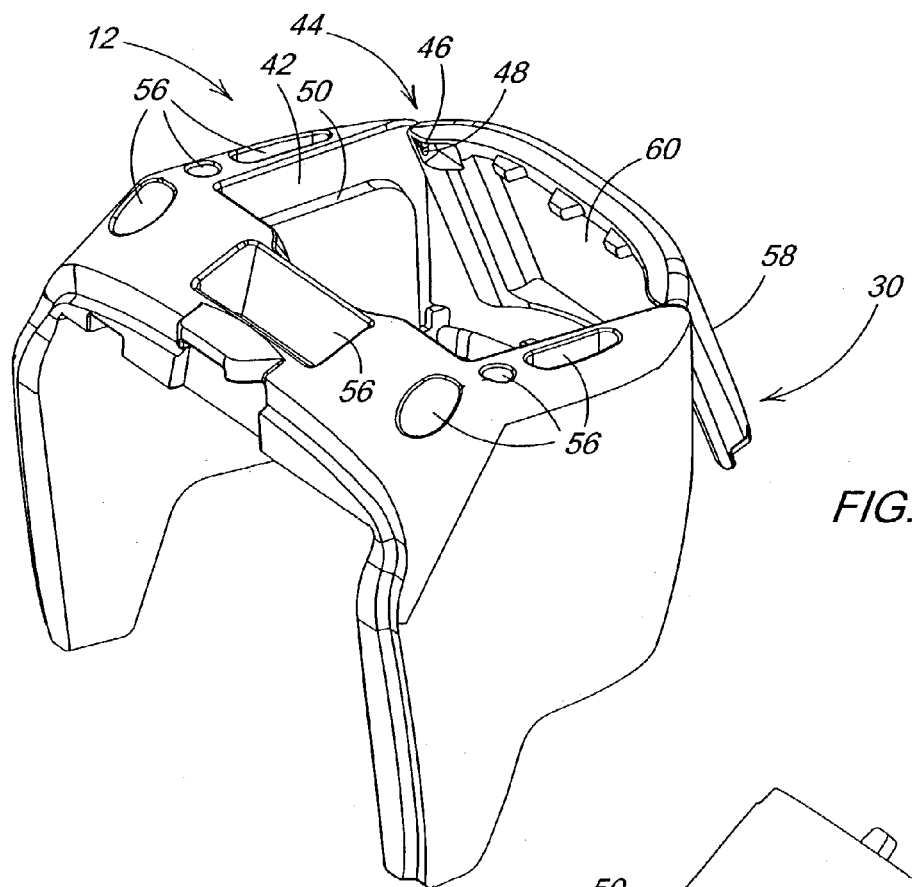
FIG. 7 illustrates a front left elevated perspective view of the cargo container with the tailgate partially opened and in its slightly rotated configuration.
Figure 8:
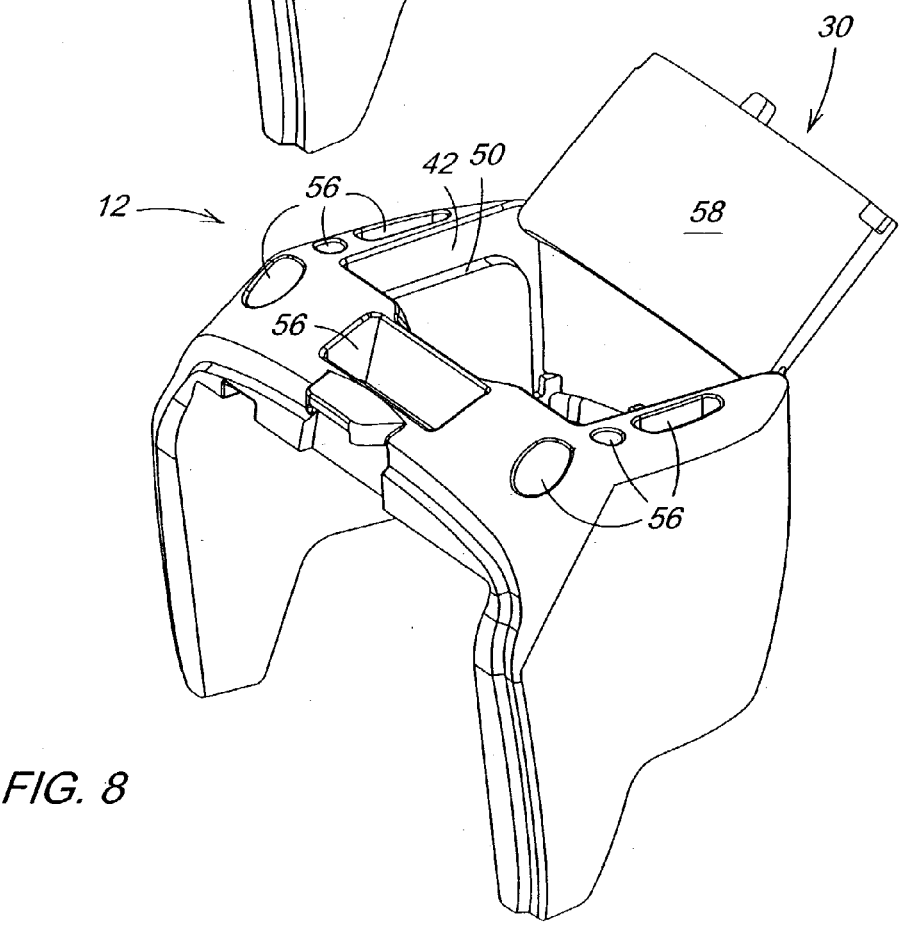
FIG. 8 illustrates a view similar to FIG. 7, but with the tailgate rotated slightly further upwardly.

As best seen in FIGS. 7 and 8, laterally extending support members 50 are provided on each side sidewall member 40 and 42 to serve as ledges upon which the tailgate 30 can be supported when it is in the second position illustrated in FIG. 10.

Figure 6:
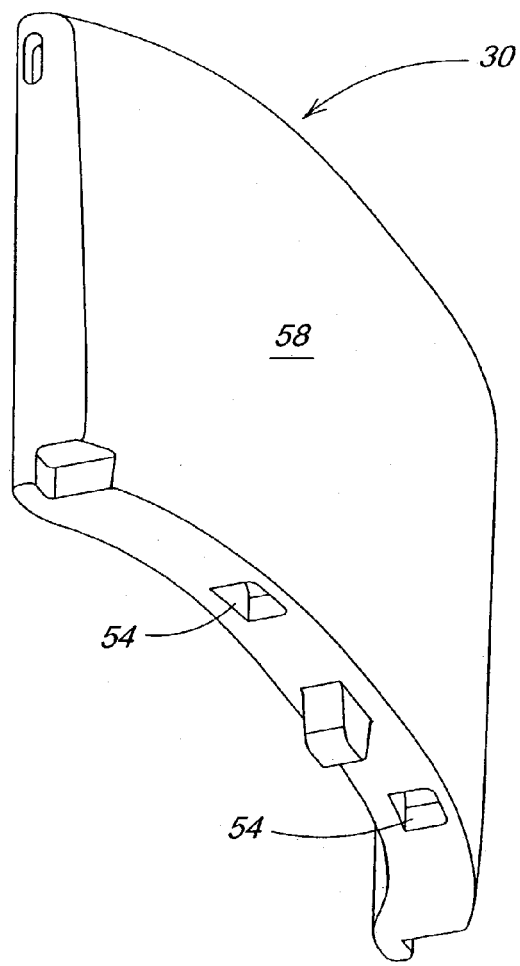
FIG. 6 illustrates a rear lower perspective view of the tailgate and specifically the lug receiving openings in the bottom portion of the tailgate.

Looking again to FIGS. 4, 6, 8 and 9, it can be seen that laterally spaced apart lug elements 52 are provided at the rear edge of the floor member 34. These lug elements 52 are receivable in lug receiving openings 54 provided in the lower edge of a portion of the tailgate 30, as is best illustrated in FIG. 6.

Along the top edges of the first, second and third sidewalls 38, 40 and 42, see FIGS. 2, 7, 9 and 10, are provided cavities or openings 56 within which tools such as shovels, shears and rakes may be carried. Since the preferred embodiment of the cargo carrier 12 is comprised of a composite material, features such as the lug elements 52, openings 54 and floor ribs 36 can easily be incorporated into the designed structure.

In operation, the cargo container 12 would be mounted to a vehicle as illustrated in FIG. 1. When it is to be used to transport cargo such as soil, mulch, sand, gravel and other materials, the rear tailgate member 30 would be in the position illustrated in FIG. 3 to form the enclosed cargo area or space. When the cargo container 12 is utilized with the tailgate 30 in this position, such materials could be moved around the lawn or job site and tools could be additionally carried in the cavities or openings 56 in the top surfaces of the three sidewall members 38, 40 and 42.

Figure 4:
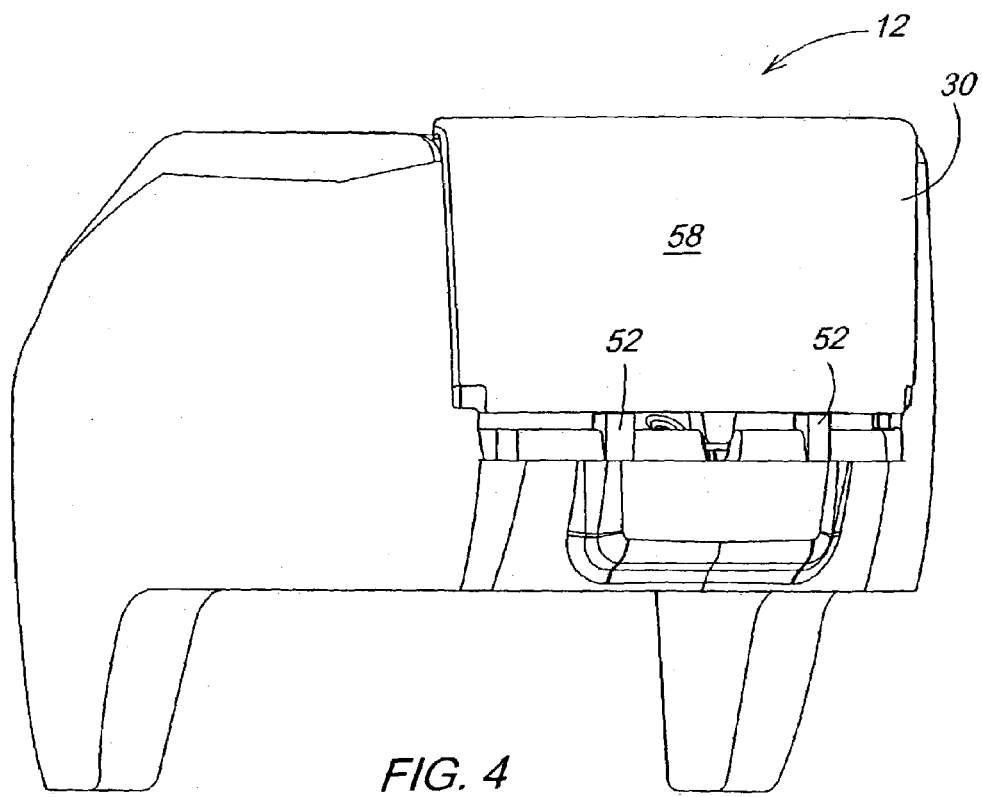
FIG. 4 illustrates a view similar to FIG. 3 with the tailgate slightly raised to disengage the locking lugs from the lug receiving elements.

When it is desired to utilize the attachment's capability to allow it to be used as a work bench station, as illustrated in FIG. 10, the operator would manually move the tailgate 30 from the position illustrated in FIG. 3 slightly upwardly to that illustrated in FIG. 4. As this occurs, the lug elements 52 become disengaged from the lug receiving openings 54 in the tailgate 30 as the slots 48 are moved upwardly along the bolts 46, see FIGS. 2 and 5. As the lug elements 52 become disengaged, the tailgate 30 can be sequentially swung about those pivot structures 44 to the positions illustrated in FIG. 6, 7, 8 and 9 to the final position illustrated in FIG. 10. As the tailgate 30 is moved to the FIG. 10 position, its rear or outer surface 58, that is the surface seen in FIG. 3, would come to rest against the support members 50 provided on the side sidewall members 40 and 42 of the container 12. The second surface 60 of the tailgate 30, which is the inside surface 60 of the container 12, as seen in FIGS. 2 and 7, is then available to serve as the workbench surface illustrated in FIG. 10.

With the tailgate 30 in the second position illustrated in FIG. 10, the operator still has access to the cargo carried in the space beneath the tailgate 30 since access is easily available.

When the operator wants to return the tailgate 30 to its first position shown in FIG. 2, he simply rotates it about its pivot structures 44 to the FIG. 4 position and then lowers it to the FIG. 3 position as the lug elements 52 engage the lug receiving openings 54. With these engaged, the tailgate 30 is secured in its first position.

Having described the preferred embodiment, it will become apparent that various modifications can be made without departing from the scope of the invention as defined in the accompanying claims.

The invention claimed is:

1. A cargo container removably mounted to a tractor, said container comprised of a bottom member adjacent to and coupled with three generally vertical sidewall members, two of the vertical sidewall members having upper rear corners and laterally extending ledges, a fourth sidewall member having lateral upper edges and a lower edge portion, a lug element and a lug receiving opening in the fourth sidewall member and the bottom member, and pivot structures between the lateral upper edges of the fourth sidewall member and the upper rear corners of two of the sidewall members to permit the fourth sidewall member to be swingably moved between a first position wherein it serves as a fourth generally vertical sidewall member to provide with the bottom member and three sidewall members a cargo storage area and a second position wherein it is generally horizontal and serves as a material supporting surface supported by the ledges;

the lug element is received in the lug receiving opening in the first position and the lug element is out of the lug receiving opening in the second position.

2. The invention defined in claim 1 wherein the fourth sidewall member includes opposite first and second surfaces with a first surface facing outward and serving as a vertical fourth side of the cargo storage area when the fourth sidewall is in its first position and the second surface facing upward and serving as the material supporting surface when said fourth sidewall member is in its second position.

3. The invention defined in claim 1 wherein there is provided an open storage area within the cargo container that is open and accessible from beneath the fourth sidewall member when it is in its second position.

4. The invention defined in claim 1 wherein two of the three generally vertical sidewall members are spaced apart, are generally parallel and include generally vertically extending edge portions with the fourth sidewall member abutting said edge portions when it is in its first position.

5. The invention defined in claim 1 wherein at least one of the sidewall members includes an opening for receivably supporting a work tool.

6. The invention defined in claim 5 wherein more than one of the sidewall members include such openings.

7. The invention defined in claim 1 wherein the container is comprised of a composite material.

8. A cargo container removably mounted to a tractor, said container comprised of a bottom member adjacent to and coupled with three generally vertical sidewall members, two of the vertical sidewall members having upper rear corners and laterally extending ledges, a fourth sidewall member having lateral upper edges, and pivot structures between the lateral upper edges of the fourth sidewall member and the upper rear corners of two of the sidewall members to permit the fourth sidewall member to be swingably moved between a first position wherein it serves as a fourth generally vertical sidewall member to provide with the bottom member and three sidewall members a cargo storage area and a second position wherein it is generally horizontal and serves as a material supporting surface supported by the ledges;

the pivot structures remaining between the lateral upper edges of the fourth sidewall member and the upper rear corners of two of the sidewall members when the fourth sidewall member is in the first position and the second position; wherein there is further provided at least one lug element and at least one lug receiving element in each of the bottom member and the fourth sidewall member with said elements being engageable when the fourth sidewall member is moved into or from its first position.

9. The invention defined in claim 8 wherein there are two pairs of engageable lug and lug receiving elements between the bottom member and the fourth sidewall member.

10. The invention defined in claim 8 wherein the lug and lug receiving elements are releasably engageable by sliding the fourth sidewall member vertically after being swingably moved.

11. The invention defined in claim 8 wherein there are two lug elements provided on the bottom member and two lug receiving elements provided on the fourth sidewall member with said lug elements being releasably engageable as the fourth sidewall member is moved vertically before the fourth sidewall member swings from the first to the second position.

12. A cargo container extending from the rear of a lawn and garden tractor, said container comprised of a bottom member connected to three generally vertical sidewall members, two of the sidewall members having lateral ledges, a fourth sidewall member having opposing first and second surfaces, the fourth sidewall member and the bottom member having a lug element and a lug receiving opening, and pivot structures coupling the fourth sidewall member with two of the three sidewall members to permit the fourth sidewall member to be swingably moved between
- a first position wherein the lug element is received in the lug receiving opening and the first surface of the fourth sidewall member faces outwardly to provide with the bottom member and three sidewall members a cargo storage area and
- a second position wherein the lug element is out of the lug receiving opening and the second surface serves as a material supporting surface spaced above the bottom member and supported by the ledges.

13. A cargo container usable with a vehicle, said container comprised of a bottom member adjacent to and coupled with three generally vertical sidewall members, two of the generally vertical sidewall members having upper rear corners and lateral ledges, a fourth sidewall member having opposing first and second surfaces and lateral upper edges with pivoting structure between the lateral upper edges of the fourth sidewall member and the upper rear corners of two of the sidewall members to permit the fourth sidewall member to be swingably moved between
- a first position wherein the first surface of the fourth sidewall member faces outwardly and it serves as a fourth generally vertical sidewall member to provide with the bottom member and three sidewall members a cargo storage area and a second position wherein it is generally horizontal and supported by the lateral ledges so that the second surface serves as a material supporting surface, and
- lug elements and lug receiving openings are provided between the fourth sidewall member and the bottom member for releasably securing the fourth sidewall member in its first position.

14. The invention defined in claim 13 further comprising pivot structures that include slots in the sides of at least one of the sidewall members to permit the fourth sidewall member to move vertically to disengage the lug elements from the lug receiving openings before being swingably moved from the first position to the second position.

* * * * *